(12) United States Patent
Badolato et al.

(10) Patent No.: US 6,623,364 B2
(45) Date of Patent: Sep. 23, 2003

(54) TUNABLE SLIP YOKE DAMPER ASSEMBLY

(75) Inventors: Anthony Russell Badolato, Dearborn, MI (US); Roger Paul Pawlowski, Warren, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/932,593

(22) Filed: Aug. 17, 2001

(65) Prior Publication Data
US 2003/0036432 A1 Feb. 20, 2003

(51) Int. Cl.[7] .................................................. F16F 9/53
(52) U.S. Cl. ........................ 464/127; 188/267.2; 310/74
(58) Field of Search ........................ 464/29, 127, 180; 310/74, DIG. 2, 51; 74/572, 573 R, 574; 188/267, 267.2

(56) References Cited

U.S. PATENT DOCUMENTS

| | | | | |
|---|---|---|---|---|
| 2,683,825 A | * | 7/1954 | Georgeff | 310/74 |
| 4,023,438 A | | 5/1977 | Birkle et al. | |
| 4,114,472 A | | 9/1978 | Hornig et al. | |
| 4,452,334 A | | 6/1984 | Rogers | |
| 4,733,758 A | | 3/1988 | Duclos et al. | |
| 5,286,013 A | | 2/1994 | Seymour et al. | |
| 5,301,899 A | * | 4/1994 | Sato | 188/267 X |
| 5,452,957 A | | 9/1995 | Duggan | |
| 5,542,508 A | | 8/1996 | Van Erden et al. | |
| 5,573,088 A | | 11/1996 | Daniels | |
| 5,634,853 A | | 6/1997 | Smith | |
| 5,678,460 A | * | 10/1997 | Walkowc | 74/574 |
| 5,816,587 A | * | 10/1998 | Stewart et al. | 188/267 X |
| 5,829,319 A | | 11/1998 | Mokeddem | |
| 5,941,133 A | | 8/1999 | Wierzba et al. | |
| 5,947,238 A | | 9/1999 | Jolly et al. | |
| 6,106,430 A | | 8/2000 | Peinemann | |

FOREIGN PATENT DOCUMENTS

| | | | |
|---|---|---|---|
| DE | 39 17 330 A | 11/1990 | |
| EP | 0 784 163 A | 7/1997 | |
| EP | 0 784 163 A1 | 7/1997 | |
| EP | 1 083 361 A | 3/2001 | |
| GB | 789031 | * 1/1958 | 310/74 |

* cited by examiner

Primary Examiner—Greg Binda
(74) Attorney, Agent, or Firm—Brinks Hofer Gilson & Lione

(57) ABSTRACT

The damper assembly, in accordance with the teachings of the present invention, can be tuned to different frequency to dampen the vibrations of the driveline assembly. The damper assembly comprises an outer housing, an inner housing and a recess defined between the inner housing and the outer housing. A magnetorheological elastomer is housed in the recess. In order to change the elastic modulus of the magnetorheological elastomer at least one magnetic means is provided in the contact with the inner housing. The magnetic means are capable of being rotated either towards the inner house or away from the inner house such that the elastic modulus of the magnetorheological elastomer is either increased or decreased.

23 Claims, 1 Drawing Sheet

TUNABLE SLIP YOKE DAMPER ASSEMBLY

TECHNICAL FIELD OF THE INVENTION

This invention generally relates to a driveline assembly in a motor vehicle and more particularly to a damper assembly installed in a slip yoke of a driveline assembly of a motor vehicle.

BACKGROUND OF THE INVENTION

As part of the often used arsenal of Noise Vibration Harshness (NVH) devices used to combat gear noise issues in the driveline system, the Slip Yoke Damper (SYD) has proved to be an integral component within many of the driveline systems currently in use. One of the core problems in the use of an SYD during the development phase is the lead time necessary to order and receive a correctly tuned damper.

Magnetorheological (MR) elastomers present the possibility of a tunable device due to the change in material characteristics with the introduction of a magnetic field. In accordance with the teachings of the present invention, the SYD assembly will make use of the variable adjustment of magnetically charged bolts, which changes the modulus of the material, and thus, the tuned frequency of the SYD. The ability to tune the SYD to a different frequency will reduce the lead time necessary to test the slip yoke dampers.

DETAILED DESCRIPTION OF THE PREFERRED EMBODIMENT OF THE INVENTION

Figure 1:
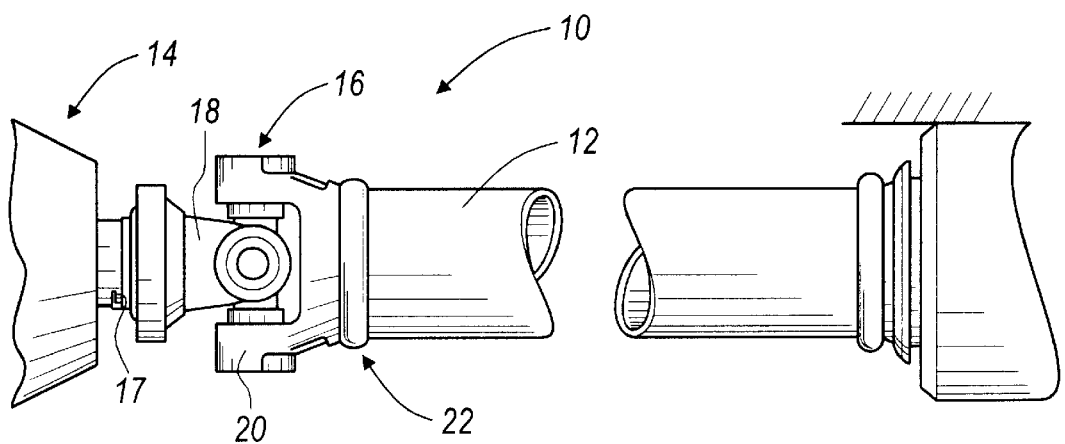
FIG. 1 is a side view of the driveline assembly in accordance with the teachings of the present invention.

The following description of the preferred embodiment is merely exemplary in nature, and is in no way intended to limit the invention or its application or uses.

Referring in particular to the drawings, a driveline assembly installed in a motor vehicle is generally illustrated by reference numeral 10. Typically, the driveline assembly 10 is adapted to transmit rotational power from an engine system 14 to a plurality of drive wheels (not shown). Typically, the driveline assembly 10 comprises a driveshaft 12 that transfers the rotational power through the driveline assembly 10. The driveshaft 12 is conventional in the art and preferably is an internally splined driveshaft 12.

In order to connect the driveshaft 12 from the engine 14 to the wheels, the driveline assembly 10 typically includes at least one slip yoke assembly 16. Due to the rotational and axial movement of the driveshaft 12, driveline assembly 10 exhibits noise and vibrations. In order to reduce the noise and dampen the vibrations of the driveline assembly 10, a damper assembly 22 is incorporated in the driveline assembly 10. In the present invention, the damper assembly 22 is a part of the slip yoke assembly 16. The damper assembly 22 functions to dampen the vibration of the driveline assembly 10, such that the vibrations are not substantially transferred to the vehicular parts of the motor vehicle. In addition, the damper assembly 22 is also capable of being adjusted such that the modulus of the driveline assembly 10 can be altered to minimize the vibrations in the vehicle.

As shown in FIG. 1, the driveshaft 12 is connected to a slip yoke assembly 16, preferably the driveshaft 12 is welded to the slip yoke assembly 16. Alternatively other suitable means may be employed to connect the slip yoke assembly 16 to the driveshaft 12. The slip yoke assembly 16 is conventional in the art and includes a yoke 18 and a an annular member 19. The universal cross joint 20 is a part of the annular member 19. The yoke 16 is typically connected to a tubular end 17 that is attached to an engine shaft (not shown).

Figure 2:
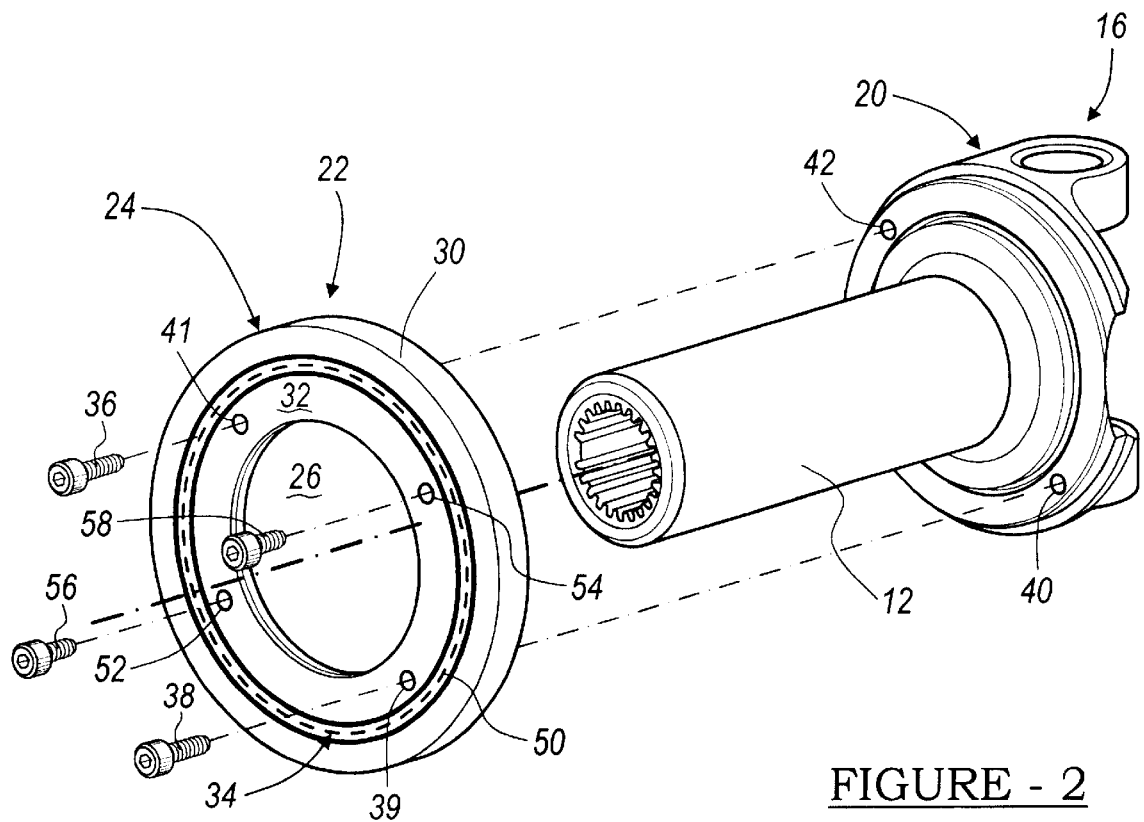
FIG. 2 is an exploded view of the damper assembly attached to a slip yoke in accordance with the teachings of the present invention.

Referring in particular to FIG. 2, in order to minimize the vibrations of the driveshaft 12 during the operation of a motor vehicle, a damper assembly 22 is installed in the slip yoke assembly 16. The damper assembly 22 of the present invention comprises a damper ring 24 that is fastened to the slip yoke assembly 16 and particularly the annular member 19. Preferably, the damper ring 24 is annular and is provided with a central opening 26. In order to facilitate the fastening of the damper ring 24, a plurality of holes 40 and 42 are provided in the universal cross joint 20. A corresponding set of openings 39 and 41 are provided in the damper ring 24. Preferably, the damper ring 24 is fastened to the slip yoke assembly 16 by means of bolts 36 and 38. The bolts 36 and 38 are dimensioned such that they are adaptable to pass through the openings 39 and 41 in the damper ring 24 and fasten the damper ring 24 to the slip yoke assembly 16. Alternatively, other means such as welding may be used to fasten the damper ring 24 to the slip yoke assembly 16. Preferably, the damper ring 24 is made of cast iron such that the damper ring 24 add more mass to the damper assembly 22 and functions to more effectively dampen the vibrations of the driveline assembly 10.

As shown in FIG. 2, the damper ring 24 preferably comprises an outer housing 30 and an inner housing 32. A gap 34 is defined between the outer housing 30 and the inner housing 32. In order to facilitate the damping of the vibrations of the driveline assembly 10, the gap 34 between the outer housing 30 and the inner housing 32 is filled with magnetorheological (MR) elastomer 50. The MR elastomer, therefore holds the outer housing 30 and the inner housing 32. The MR elastomer is conventional in the art and may comprise a suitable gel as an elastomer of natural rubber. The gel or elastomer has particulate materials embedded therein. Preferred particulates are those that are magnetisable by means of an applied magnetic field, that is, particulates having paramagnetic, ferromagnetic, or ferromagnetic properties. The size of the magnetisable particles used can vary widely, such as, for example, from 10 nanometers to several millimeters. Preferably, the recess 34 is filled with the MR elastomer rubber ring where the characteristics of the MR elastomer 50 may be altered by changing the magnetic field applied to the damper assembly 22.

In order to vary the magnetic field and hence the elastic modulus of the MR elastomer 50, the inner housing 32 is provided with a plurality of openings 52 and 54. As shown in FIG. 2, the openings 52 and 54 are disposed opposite each other. Although this is a preferred embodiment, it is possible that the two openings 52 and 54 are disposed anywhere on the inner housing. Alternatively, it is also possible that more than two openings are provided to vary the magnetic field of the MR elastomer 50.

The openings 52 and 54 are configured to receive a pair of magnetic bolts, 56 and 58. Preferably, the magnetic bolts 56 and 58 are permanent magnets. Alternatively they could be temporarily magnetized by suitable means such as passing current through them. In the preferred embodiment, the bolts 56 and 58, are threaded bolts such that they are capable of being axially rotated towards or away from the inner housing 32.

The magnetic bolts 54 and 58, create a magnetic field in the damper assembly 22. The magnetic field will subsequently result in the alignment of the particulates in the MR elastomer. The alignment of the particulates in the MR elastomer will determine the elastic modulus of the MR elastomer. The elastic modulus of the MR elastomer can be varied either by axially turning the magnetic bolts towards the inner housing or by axially turning the magnetic bolts away from the inner housing. Therefore, by turning the magnetized bolts towards the inner housing 32, the elastic modulus of the MR elastomer will increase and thereby increasing the stiffness of the MR elastomer. Alternatively, the elastic modulus of the MR elastomer may be reduced by turning the magnetic bolts away from the inner housing 32.

The present invention also provides for a method of tuning the damper assembly 22 to different frequencies to effectively dampen the vibrations of the driveline assembly 10. In particular the damper assembly 22 is first tuned to a baseline frequency. Next vehicle testing is performed to natural frequency of the driveline assembly for a particular speed. Also, the torsional mode is determined of the driveline assembly 10. The magnetized bolts 56 and 56 are then rotated to either increase or decrease the elastic modulus of the MR elastomer, to match the baseline frequency of the damper assembly 22 with the natural frequency of the drive line assembly. Further the damper assembly can be tuned to different frequency by merely adjusting the bolts 56 and 58. Therefore, the present invention provides for tuning one damper assembly to different frequencies. This is especially advantageous during testing of the driveline assembly 10, as one damper assembly 22 can be substantially tuned to damper the vibrations of the driveline assembly.

As any person skilled in the art will recognize from the previous description and from the figures and claims, modifications and changes can be made to the preferred embodiment of the invention without departing from the scope of the invention as defined in the following claims.

What is claimed is:

1. A damper assembly fastenable to a slip yoke assembly in a drive line assembly of a motor vehicle comprising:
   an outer housing;
   an inner housing wherein the inner housing has a first opening;
   a gap defined between the inner housing and the outer housing;
   a magnetorheological elastomer housed in the gap between the outer housing and inner housing; and
   at least one magnetic means received in the first opening such that a axial movement of the magnetic means changes the elastic modulus of the magnetorheological elastomer.

2. The damper assembly of claim 1, wherein the inner housing comprises a second opening for receiving fasteners to connect the damper assembly to the slip yoke assembly.

3. The damper assembly of claim 2, wherein the fasteners are bolts.

4. The damper assembly of claim 1, wherein the axial movement of the magnetic means comprises rotating the magnetic means towards the inner housing.

5. The damper assembly of claim 4, wherein rotating the magnetic means towards the inner housing increases the elastic modulus of the magnetorheological elastomer.

6. The damper assembly of claim 1, wherein the axial movement of the magnetic means comprises rotating the magnetic means away from the inner housing.

7. The damper assembly of claim 6, wherein rotating the magnetic means away from the inner housing decreases the elastic modulus of the magnetorheological elastomer.

8. The damper assembly of claim 1, wherein the magnetic means for varying the elastic modulus of the elastomer are magnetic bolts.

9. The damper assembly of claim 1, wherein the inner housing is made of cast metal.

10. The damper assembly of claim 1, wherein the outer housing is made of cast metal.

11. A driveline assembly installed in a motor vehicle comprising:
    a tubular shaft having a first end and a second end, wherein the shaft transfers rotational energy from an engine to the wheels of the motor vehicle;
    a slip yoke assembly having a yoke member and an annular member attached to the yoke member, wherein the yoke member is rotatably coupled to the shaft;
    a damper assembly fastened to the annular member of the slip yoke assembly;
    wherein the damper assembly comprises an outer housing, an inner housing and a recess defined between the outer and the inner housing;
    such that the inner housing defines a first opening;
    a magnetorheological elastomer located in the recess between the outer housing and inner housing; and
    at least one magnetic means received in the first opening such that a axial movement of the at least one magnetic means changes the elastic modulus of the magnetorheological elastomer, and thus changes the frequency of the slip yoke.

12. The driveline assembly of claim 11, wherein the inner housing further comprises a second opening for receiving fasteners to connect the damper assembly to the slip yoke assembly.

13. The driveline assembly of claim 12, wherein the fasteners are bolts.

14. The driveline assembly of claim 11, wherein the axial movement of the magnetic means comprises rotating the magnetic means towards the inner housing.

15. The driveline assembly of claim 14, wherein rotating the magnetic means towards the inner housing increases the elastic modulus of the magnetorheological elastomer.

16. The driveline assembly of claim 11, wherein the axial movement of the magnetic means comprises rotating the magnetic means away from the inner housing.

17. The driveline assembly of claim 16, wherein rotating the magnetic means away from the inner housing decreases the elastic modulus of the magnetorheological elastomer.

18. The driveline assembly of claim 11, wherein the magnetic means for varying the elastic modulus of the magnetorheological elastomer is magnetic bolts.

19. The driveline assembly of claim 11, wherein the inner housing is made of cast metal.

20. The drive train assembly of claim 11, wherein the outer housing is made of cast metal.

21. A method of damping the vibrations of a driveline assembly in a motor vehicle, the method comprising the steps of:
    providing a damper assembly;
    fastening the damper assembly to a slip yoke assembly, wherein the damper assembly has an inner housing and an outer housing;
    providing a recess between the inner housing and the outer housing;
    defining a first opening in the inner housing;
    providing a magnetorheological elastomer in the recess between the inner housing and the outer housing; and providing al least one magnetic means in the first opening such that rotation of the at least one magnetic means changes the elastic modulus of the magnetorheological elastomer.

22. The method of claim 14 further comprising the steps of:

measuring a natural frequency of the driveline assembly of the motor vehicle;

measuring a torsional mode of the driveline assembly;

tuning the damper assembly to a baseline frequency;

moving the at least one magnetic means either towards the inner housing or away from the inner housing such that the baseline frequency of the damper assembly matches the natural frequency of the driveline assembly.

23. The method of claim 14 wherein the at least one magnetic means is magnetic bolts.

* * * * *

UNITED STATES PATENT AND TRADEMARK OFFICE
CERTIFICATE OF CORRECTION

PATENT NO.    : 6,623,364 B2
DATED         : September 23, 2003
INVENTOR(S)   : Anthony R. Badolato et al.

It is certified that error appears in the above-identified patent and that said Letters Patent is hereby corrected as shown below:

Column 5,
Line 1, delete "claim 14" and substitute -- claim 21 -- in its place.

Column 6,
Line 1, delete "claim 14" and substitute -- claim 21 -- in its place.

Signed and Sealed this

Twenty-third Day of March, 2004

JON W. DUDAS
*Acting Director of the United States Patent and Trademark Office*